(12) United States Patent
Abe et al.

(10) Patent No.: US 9,178,189 B2
(45) Date of Patent: Nov. 3, 2015

(54) SHEET-TYPE SECONDARY BATTERY AND METHOD OF MANUFACTURING SAME

(75) Inventors: Kiyoko Abe, Yonezawa (JP); Masashi Akiba, Yonezawa (JP); Katsumi Kawai, Yonezawa (JP); Taro Ueno, Yonezawa (JP); Yasunori Ozawa, Yonezawa (JP); Kazunori Ozawa, Tokyo (JP)

(73) Assignee: ENAX, INC., Tokyo (JP)

( * ) Notice: Subject to any disclaimer, the term of this patent is extended or adjusted under 35 U.S.C. 154(b) by 51 days.

(21) Appl. No.: 13/522,851

(22) PCT Filed: Jan. 13, 2011

(86) PCT No.: PCT/JP2011/050469
§ 371 (c)(1),
(2), (4) Date: Jul. 18, 2012

(87) PCT Pub. No.: WO2011/089965
PCT Pub. Date: Jul. 28, 2011

(65) Prior Publication Data
US 2012/0288746 A1   Nov. 15, 2012

(30) Foreign Application Priority Data

Jan. 19, 2010  (JP) ................. 2010-009420
Aug. 6, 2010   (JP) ................. 2010-177373

(51) Int. Cl.
*H01M 6/12* (2006.01)
*H01M 2/02* (2006.01)
(Continued)

(52) U.S. Cl.
CPC ............ *H01M 2/0287* (2013.01); *B32B 15/08* (2013.01); *H01M 2/06* (2013.01); *H01M 2/08* (2013.01);
(Continued)

(58) Field of Classification Search
CPC ....... H01M 2/0287; H01M 2/06; H01M 2/08; H01M 10/0413; H01M 2/30; H01M 10/0585; H01M 10/052; B02B 15/08; Y02E 60/122; Y02T 10/7011
USPC ......................................... 429/162; 29/623.2
See application file for complete search history.

(56) References Cited

U.S. PATENT DOCUMENTS

| 6,267,790 B1 | 7/2001 | Daroux et al. |
| 6,877,216 B2 | 4/2005 | Fukuda et al. |

(Continued)

FOREIGN PATENT DOCUMENTS

| JP | 3-68358 U | 7/1991 |
| JP | 2001-52660 A | 2/2001 |

(Continued)

OTHER PUBLICATIONS

International Preliminary Report on Patentability for corresponding International Patent Application No. PCT/JP2011/050469, dated Oct. 11, 2012.

(Continued)

*Primary Examiner* — Gary Harris
(74) *Attorney, Agent, or Firm* — Birch, Stewart, Kolasch & Birch, LLP (57) ABSTRACT

Disclosed is a sheet-type secondary battery having: a laminated sheath (2) including an inner layer (2a) made of a thermoplastic resin and a metal layer (2b); and electrode terminals (3), each of which is connected electrically to an internal electrode pair (1) and passes through a heat seal portion (20) of the laminated sheath (2) in a hermetic manner so as to be led out externally. The sheath (2) and electrode terminal (3) are bonded with a bonding resin (5) at portion (20) in which terminal (3) is interposed. The inner layer (2a) of the sheath (2) opposed to the terminal (3) has an excess resin receiving portion (20a) formed thereon for receiving an excess resin in a heat sealing process. The portion (20a) is not formed in a heat seal portion (20P) at which the inner layers (2a) of the laminated sheaths (2) are bonded.

12 Claims, 7 Drawing Sheets

(51) Int. Cl.
*H01M 2/06* (2006.01)
*H01M 2/08* (2006.01)
*H01M 10/04* (2006.01)
*H01M 10/052* (2010.01)
*H01M 10/0585* (2010.01)
*B32B 15/08* (2006.01)
*H01M 2/30* (2006.01)

(52) U.S. Cl.
CPC ............ *H01M 2/30* (2013.01); *H01M 10/0413* (2013.01); *H01M 10/052* (2013.01); *H01M 10/0585* (2013.01); *Y02E 60/122* (2013.01); *Y02T 10/7011* (2013.01); *Y10T 29/4911* (2015.01)

(56) References Cited

U.S. PATENT DOCUMENTS

| | | | |
|---|---|---|---|
| 7,393,610 B2 | 7/2008 | Shimamura et al. | |
| 7,749,648 B2 | 7/2010 | Kim | |
| 8,263,256 B2 | 9/2012 | Hatta et al. | |
| 2006/0093905 A1* | 5/2006 | Kim | 429/175 |
| 2008/0070111 A1* | 3/2008 | Abe et al. | 429/163 |

FOREIGN PATENT DOCUMENTS

| | | | | |
|---|---|---|---|---|
| JP | 2001-229889 A | | 8/2001 | |
| JP | 2001-229890 A | | 8/2001 | |
| JP | 2001229889 A | * | 8/2001 | ............. H01M 2/06 |
| JP | 2004-95401 A | | 3/2004 | |
| JP | 2004-95410 A | | 3/2004 | |
| JP | 2004-95471 A | | 3/2004 | |
| JP | 2006-93120 A | | 4/2006 | |
| JP | 2006-164868 A | | 6/2006 | |
| JP | 2007-5101 A | | 1/2007 | |
| JP | 2009-26581 A | | 2/2009 | |

OTHER PUBLICATIONS

Decision of Patent Grant for Japanese Patent Application No. 2011-550886, dated May 15, 2012.
International Search Report for International Patent Application No. PCT/JP2011/050469, dated Apr. 26, 2011.
Extended European Search Report for European Application No. 11734572.8, dated Sep. 9, 2013.

\* cited by examiner

SHEET-TYPE SECONDARY BATTERY AND METHOD OF MANUFACTURING SAME

TECHNICAL FIELD

The present invention relates to a sheet-type secondary battery and a method of manufacturing the same, and more particularly, to, but not limited to, a sheet-type secondary battery having a large capacity, which is used appropriately for an electric vehicle, an uninterruptible power system (UPS), or load leveling, for example, and a method of manufacturing the same.

BACKGROUND ART

In recent years, there are very strong demands for smaller size and lighter weight of various electronic devices. In order to meet those demands, it is required to improve performance of a secondary battery as a power source, and hence development and improvement of various batteries have been carried out. For instance, a lithium ion secondary battery is a secondary battery that can realize highest voltage, highest energy density, and highest load bearing performance among existing battery types, and is being still improved intensely.

This lithium ion secondary battery generally includes a sheet-type internal electrode pair formed by laminating, via separators, sheet-type positive electrodes formed of a sheet-type positive electrode collector and a positive active material applied to a surface thereof, and sheet-type negative electrodes formed of a sheet-type negative electrode collector and a negative active material applied to a surface thereof, a battery case that covers the internal electrode pair in a sealed state and is filled with electrolyte, and a positive electrode terminal and a negative electrode terminal connecting respectively from the positive electrodes and the negative electrodes of the internal electrode pair in the battery case to a positive terminal and a negative terminal provided to the battery case. At the time of charging, lithium flows out of the positive active material of the positive electrode into the electrolyte as lithium ions, and the lithium ions enter the negative active material of the negative electrode. At the time of discharging, the lithium ions that have entered the negative active material are released into the electrolyte to return into the positive active material of the positive electrode again. Thus, charging and discharging are performed. This lithium ion secondary battery can achieve high energy density, and hence it is expected as a large capacity secondary battery to be used in the field of a hybrid vehicle (HV), an electric vehicle (EV), or the like, for example, and thus many developments and proposals have already been carried out.

For instance, as such a lithium ion secondary battery, there is proposed a battery having a sheath made of a laminated film, in which the internal electrode pair and the electrolyte are sealed (see, for example, Patent Literature 1).

Here, Patent Literature 1 discloses a sheet-type secondary battery including electricity generating elements such as positive electrodes, negative electrodes, and separators are housed and sealed in a sheathing film as a laminated sheath made of a metal-resin composite material. In order to prevent occurrence of wrinkles or the like in the sheathing film in a heat sealing process or the like, a sealing portion of the sheathing film is embossed.

CITATION LIST

Patent Literature

[PTL 1]: JP 2001-52660 A

SUMMARY OF INVENTION

Technical Problem

By the way, in recent years, there are more requests for larger capacity of a single secondary battery cell, and hence it is desired to adopt electrode terminals having a large cross-sectional area so that relatively large current can be taken out.

In such a request, there is the following problem. Only the simple formation of irregularities in the sealing portion of the laminated sheath for preventing wrinkles as performed in the secondary battery disclosed in the above-mentioned Patent Literature causes insufficient sealing performance and insulating performance when adopting thick and wide electrode terminals having a large cross-sectional area.

In particular, in order to improve bonding property (adhesiveness) between the electrode terminal and an inner layer (heat seal resin) of a very thin laminated sheath having flexibility, a bonding resin for bonding is disposed therebetween, and the electrode terminal is bonded to the laminated sheath via the bonding resin. In this case, an excess bonding resin in the heat sealing process moves (is melted to flow) along a surface of the electrode terminal by hot pressure welding. Then, there is a problem that melt lump or the like is generated, resulting in uneven thickness of a resin layer, or a gap is generated, resulting in deterioration in the sealing performance or the insulating performance. In addition, because of a restriction of an installation space or a layout due to downsizing of the device to which the sheet-type secondary battery is mounted, an unexpected external stress such as bending load may be applied to a periphery of the laminated sheath when the sheet-type secondary battery is mounted. In this situation, there is a problem that the sealing performance or the insulating performance around the electrode terminal is apt to be deteriorated more.

Further, as the electrode terminal becomes thicker and wider, a quantity of heat necessary for sealing becomes larger so that the melt flow or the melt lump is apt to occur easily. Therefore, the above-mentioned tendency causes a conspicuous problem in the case where the electrode terminal having a large cross-sectional area is adopted for achieving larger capacity.

The present invention is made in view of the above-mentioned problems of the conventional technology, and it is an object thereof to provide a sheet-type secondary battery and a method of manufacturing the same, in which sealing performance and insulating performance around the electrode terminal can be secured even in a form in which the flexible laminated sheath and the electrode terminal are bonded via the bonding resin.

Solution to Problem

In order to achieve the above-mentioned object, a sheet-type secondary battery according to the present invention includes: a flexible laminated sheath including an inner layer and a metal layer, the inner layer being made of a thermoplastic resin capable of heat sealing; an internal electrode pair formed by alternately laminating a sheet-type positive electrode and a sheet-type negative electrode via a separator, the internal electrode pair being housed inside the flexible laminated sheath in a sealed state by a heat seal portion formed on a periphery of the flexible laminated sheath; and electrode terminals, each of which is connected electrically to the internal electrode pair and passes through the heat seal portion of the flexible laminated sheath in a hermetic manner so as to be led out externally, in which: the flexible laminated sheath and the electrode terminal are bonded with a bonding resin at the heat seal portion in which the electrode terminal is interposed; and the inner layer of the flexible laminated sheath opposed to the electrode terminal has an excess resin receiving portion formed thereon for receiving an excess resin in a heat sealing process, and the excess resin receiving portion is not formed in a heat seal portion at which the inner layers of the flexible laminated sheaths are bonded.

With this structure, the laminated sheath and the electrode terminal can be bonded easily via the bonding resin. When the laminated sheath is sealed (by heat sealing), an excess resin is absorbed and received in the excess resin receiving portion. Thus, without troublesome and complicated adjustment control of the thickness of the bonding resin, the pressure, and the like, it is possible to contribute to improvement of seal reliability and insulation reliability. In addition, even if an unexpected external stress such as bending load is applied to the flexible laminated sheath, the sealing performance and the insulating performance can be maintained stably.

Further, a formation position of the excess resin receiving portion may be set so that, at the heat seal portion in which the electrode terminal is interposed, a total thickness as a sum of a thickness of the bonding resin and a thickness of the inner layer of the flexible laminated sheath after sealing becomes 65 to 90% of the total thickness before sealing.

With this structure, both the sealing performance and the insulating performance around the electrode terminal can be stably secured.

Further, the formation position of the excess resin receiving portion may be set with reference to a normal heat seal portion at which the inner layers of the flexible laminated sheaths are bonded.

With this structure, the formation position of the excess resin receiving portion can be stably set with reference to the flat surface of the normal heat seal portion, and hence it is possible to contribute to securing more stable sealing performance and insulating performance around the electrode terminal.

Further, the excess resin receiving portion may be formed to protrude from a surface of the flexible laminated sheath.

With this structure, the state where the excess resin receiving portion is formed can be determined from external appearance, and hence it is possible to easily confirm by visual inspection that the sealing performance and the insulating performance are secured.

Further, the bonding resin may be made of a similar material to a material of the inner layer of the flexible laminated sheath, which is a thermoplastic resin having a crosslinked structure.

Further, the electrode terminals may each be a plate-like terminal having a thickness of 0.2 to 5.0 mm and a length of 16 to 100 mm along the heat seal portion.

With this structure, it is possible to apply more appropriately to the structure adopting the electrode terminal having a large cross-sectional area in which the sealing performance and the insulating performance around the electrode terminal can be of concern in particular.

In the above, the sheet-type secondary battery can have a capacity of 1.5 Ah or larger.

With this structure, it is possible to appropriately apply to a sheet-type secondary battery that naturally needs the electrode terminal having a large cross-sectional area.

According to the present invention, there is provided a method of manufacturing a sheet-type secondary battery, the sheet-type secondary battery including an internal electrode pair formed by alternately laminating a sheet-type positive electrode and a sheet-type negative electrode via a separator, the internal electrode pair being housed inside a flexible laminated sheath including an inner layer and a metal layer, the inner layer being made of a thermoplastic resin capable of heat sealing, the method including: using a pair of sealing jigs having dents of a predetermined shape; roughening a surface of an electrode terminal connected to the internal electrode pair; applying, onto the surface, a thermoplastic bonding resin capable of being bonded with the surface; and heat sealing the flexible laminated sheath with the electrode terminal and the thermoplastic bonding resin applied on the surface so that heat seal portions of the flexible laminated sheaths from which the electrode terminal protrudes are sandwiched by the pair of sealing jig, followed by hot pressing, in which the hot pressing includes forming, in the inner layer of the flexible laminated sheath of a heat seal portion in which the electrode terminal is interposed, an excess resin receiving portion for receiving an excess resin in a heat sealing process, and avoiding forming the excess resin receiving portion in a heat seal portion at which the inner layers of the flexible laminated sheaths are bonded.

According to this manufacturing method, the electrode terminal can be bonded to the laminated sheath easily. In addition, the excess resin receiving portion for receiving the excess resin in a heat sealing process can be formed simultaneously with the heat sealing without adding another step. Further, it is possible to easily manufacture the sheet-type secondary battery capable of securing both the sealing performance and the insulating performance even if an unexpected external stress such as bending load is applied to the flexible laminated sheath.

Further, a formation position of the excess resin receiving portion may be set so that a total thickness as a sum of a thickness of the thermoplastic bonding resin and a thickness of the inner layer of the flexible laminated sheath after sealing becomes 65 to 90% of the total thickness before sealing.

According to this manufacturing method, both the sealing performance and the insulating performance around the electrode terminal can be stably secured.

Further, the pair of sealing jigs may each include a flat reference seal surface for hot pressing a normal heat seal portion at which the inner layers of the flexible laminated sheaths are bonded, and a receiving portion forming surface for hot pressing a heat seal portion of the flexible laminated sheath opposed to the electrode terminal so as to form the excess resin receiving portion, and the formation position of the excess resin receiving portion may be set based on the flat reference seal surface.

According to this manufacturing method, the formation position of the excess resin receiving portion can be stably set with reference to the flat reference seal surface, and hence it is possible to secure an isolation distance between the laminated sheath and the electrode terminal more stably, and it is possible to contribute to mechanization and mass production.

Further, the excess resin receiving portion may be formed to protrude from an outer surface of the laminated sheath.

With this structure, the state where the excess resin receiving portion is formed can be determined from external appearance, and hence it is possible to easily confirm by visual inspection that the sealing performance and the insulating performance are secured.

Further, the bonding resin may be made of a similar material to a material of the inner layer of the flexible laminated sheath, which is a thermoplastic resin having a crosslinked structure.

With this structure, the electrode terminal and the inner layer of the laminated sheath can be bonded appropriately.

Further, the electrode terminal may be a plate-like terminal having a thickness of 0.2 to 5.0 mm and a length of 16 to 100 mm along the heat seal portion.

With this structure, it is possible to provide a manufacturing method suitable for a sheet-type secondary battery adopting the electrode terminal having a large cross-sectional area in which the sealing performance and the insulating performance around the electrode terminal can be of concern in particular.

In the above, the sheet-type secondary battery may have a capacity of 1.5 Ah or larger.

With this structure, it is possible to appropriately apply to a sheet-type secondary battery that naturally needs the electrode terminal having a large cross-sectional area.

Advantageous Effects of Invention

According to the present invention, it is possible to easily realize the sheet-type secondary battery by a simple structure, in which the sealing performance and the insulating performance around the electrode terminal can be stably secured even if the laminated sheath and the electrode terminal are bonded via the bonding resin, and also the manufacturing method therefor.

BRIEF DESCRIPTION OF DRAWINGS

FIG. 6 are a schematic diagrams illustrating a state where an excess resin receiving portion is formed by the sealing jig used for the method of manufacturing the sheet-type secondary battery according to the present invention, in which FIG. 6(a) illustrates a state where the excess resin receiving portion is formed when hot pressing is performed by the sealing jig from an outer layer of the laminated sheath, and FIG. 6(b) illustrates a state where the excess resin receiving portion is formed when an inner layer of the laminated sheath is directly hot pressed by the sealing jig.

DESCRIPTION OF EMBODIMENT

Figure 1:
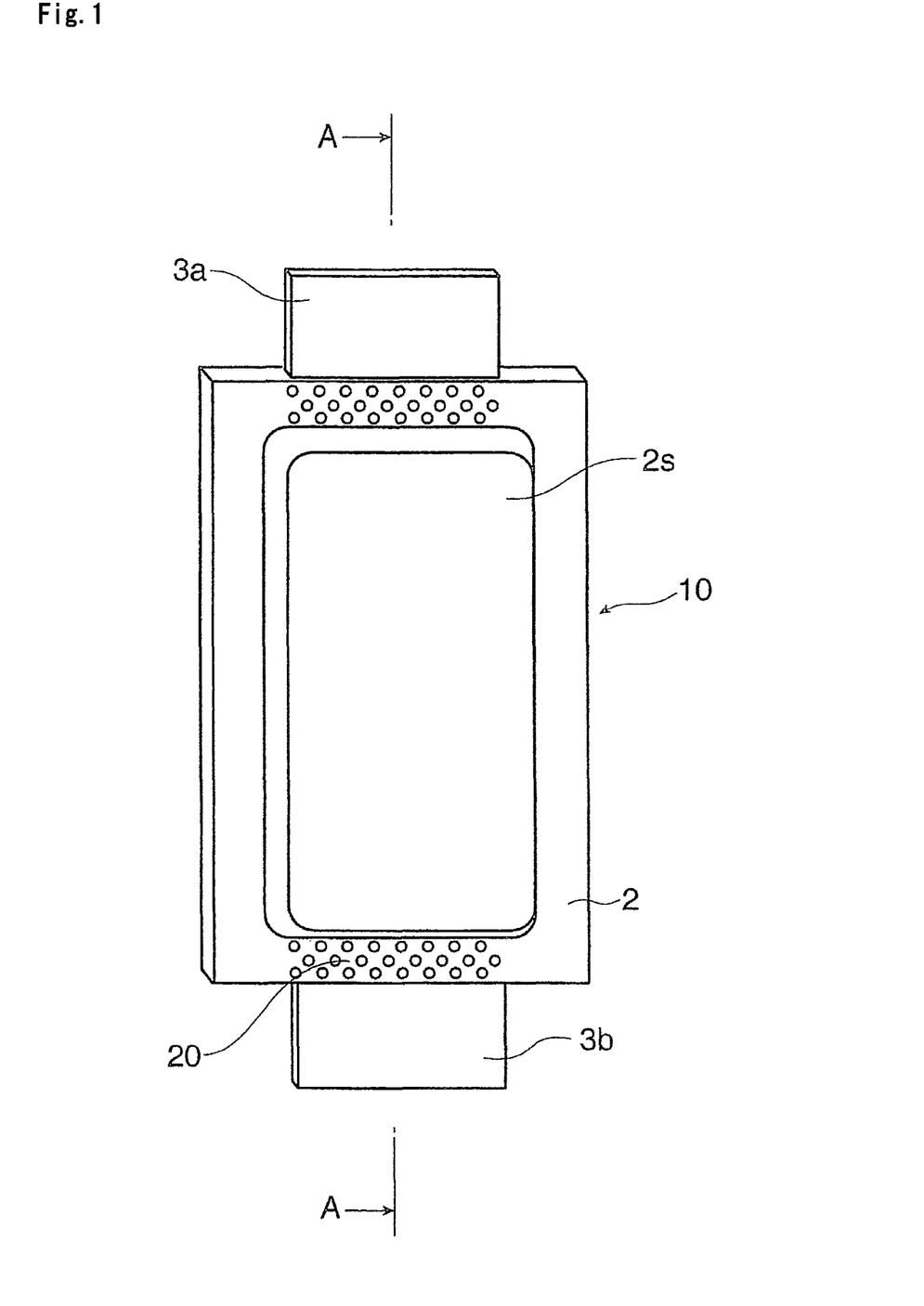
FIG. 1 is a perspective view schematically illustrating a sheet-type secondary battery according to the present invention.
Figure 2:
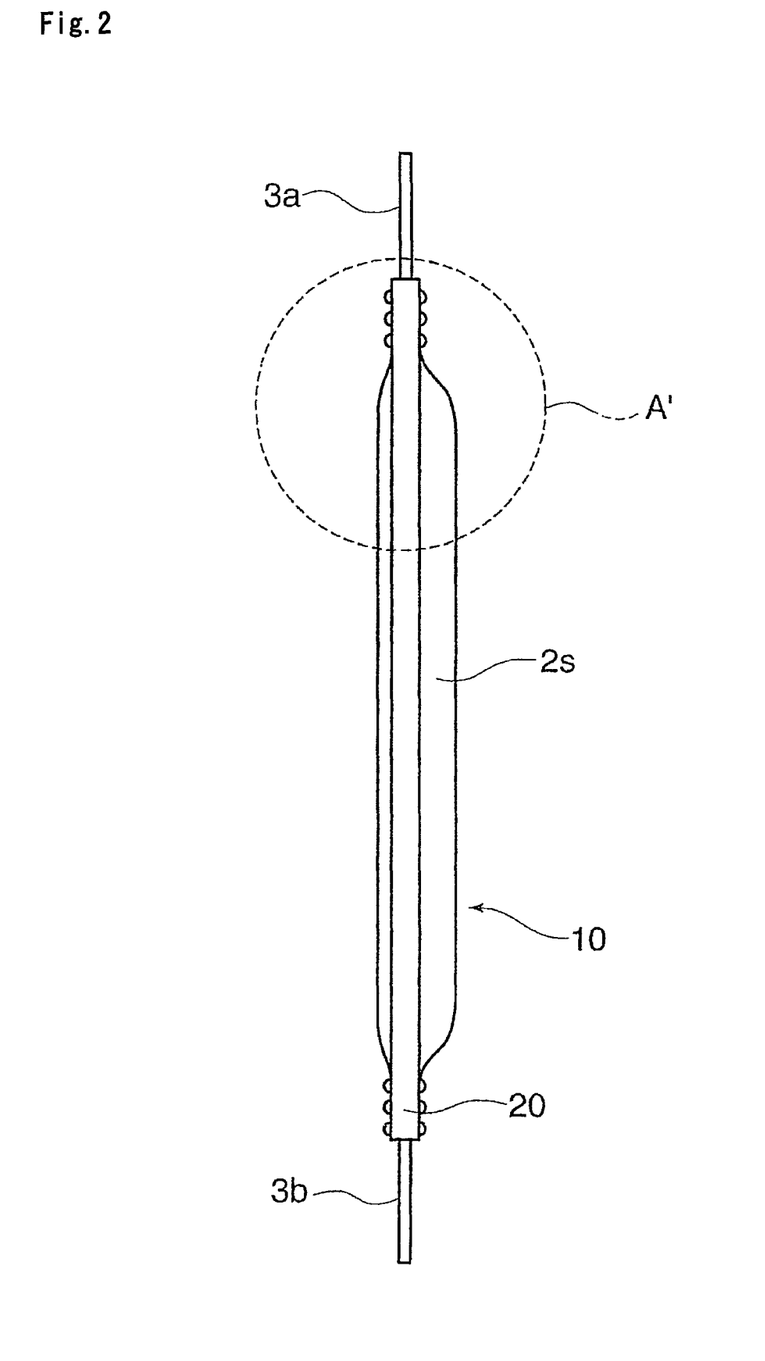
FIG. 2 is a left side view of the sheet-type secondary battery of FIG. 1.
Figure 3:
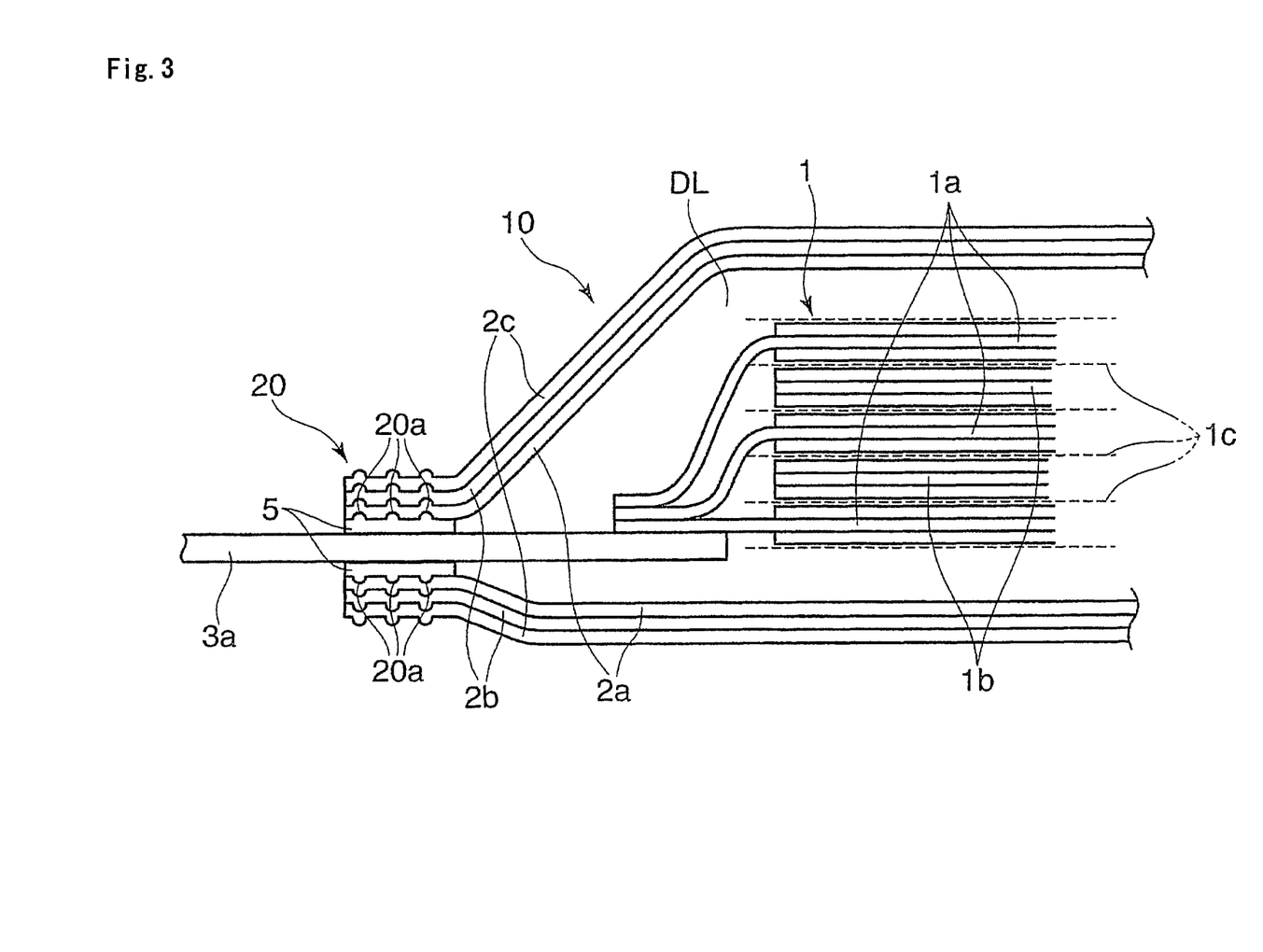
FIG. 3 is an A-A cross-sectional view of the sheet-type secondary battery of FIG. 1 and is an enlarged view of a part encircled by a circle A' of FIG. 2.
Figure 4:
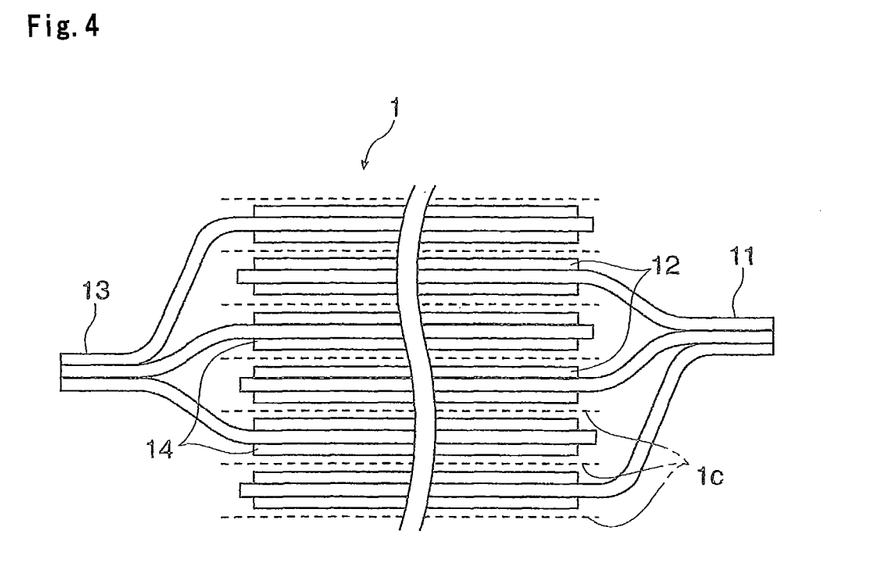
FIG. 4 is a schematic enlarged view illustrating an internal electrode pair illustrated in FIG. 1.

Hereinafter, an embodiment of the present invention is described with reference to FIGS. 1 to 4. Here, FIG. 1 is a perspective view schematically illustrating an example of a sheet-type secondary battery according to the present invention, and FIG. 2 is a left side view of FIG. 1. In addition, FIG. 3 is an A-A cross-sectional view of FIG. 1 and is an enlarged view of a part encircled by a circle A' in FIG. 2. FIG. 4 is a schematic diagram illustrating a structure of an internal electrode pair.

In FIGS. 1 to 3, reference numeral 10 denotes a sheet-type lithium ion secondary battery (sheet-type secondary battery), and a flexible laminated sheath 2 houses an internal electrode pair 1 and electrolyte DL inside in a sealed state. Specifically, as illustrated best in FIG. 3, the internal electrode pair 1 including a plurality of sheet-type positive electrodes 1a and a plurality of sheet-type negative electrodes 1b laminated alternately via separators 1c is housed inside a laminated sheath 2 together with the electrolyte DL in a sealed state. Further, a conductive positive electrode lead 3a (positive electrode terminal) connected electrically to the positive electrodes 1a of the internal electrode pair 1 passes through a heat seal portion 20 of the laminated sheath 2 in a hermetic manner and fixed to the heat seal portion 20. The part of the positive electrode lead 3a passing through the heat seal portion 20 and protruding to the outside of the laminated sheath 2 to be led out is used as an external terminal. In addition, although illustration is omitted, the negative electrodes 1b are also connected electrically to a conductive negative electrode lead 3b (negative electrode terminal). As illustrated in FIG. 1, the negative electrode terminal 3b passes through the heat seal portion 20 similarly to the positive electrode terminal 3a from the end portion opposite to the positive electrode terminal 3a across the laminated sheath 2 (in this example, the lower end portion in FIG. 1) and is led to the outside in a hermetic manner. Note that, the sheet-type secondary battery 10 according to this embodiment is aimed to obtain larger capacity. Because many laminated sheet-type electrodes 1a and 1b are collected and are connected to the corresponding electrode terminals 3a and 3b, respectively, as described above, the electrode terminals 3a and 3b naturally have relatively large cross-sectional areas.

In this embodiment, as illustrated best in FIG. 4, the internal electrode pair 1 is formed into a sheet-type shape in which the sheet-type positive electrodes 1a each formed by applying a positive active material 12 to both sides of a positive electrode collector 11 made of aluminum and the sheet-type negative electrodes 1b each formed by applying a negative active material 14 to both sides of a negative electrode collector 13 made of copper are alternately laminated via the separators 1c. The positive electrode collector 11 made of aluminum and the negative electrode collector 13 made of copper are respectively formed as very thin metal foil having a thickness of approximately 5 to 30 μm. Note that, the above-mentioned active materials are not applied to end portions of the sheet-type electrodes 1a and 1b, which are connected to the electrode terminal 3.

In this embodiment, as the positive active material 12, a composite oxide of lithium such as lithium cobalt composite oxide (LCO), lithium manganese composite oxide (LMO), or lithium nickel composite oxide (LNO) may be used. Further, as the positive active material 12, a ternary material such as LNMCO, or a binary material such as LMNO, LMCO, or LNCO may be used. Alternatively, a mixture of these main materials may be used.

On the other hand, as the negative active material 14, a carbon material such as graphite, hard carbon, or soft carbon may be used, and alternately, a mixture of these main materials may be used. In addition, lithium titanate (LTO) (in this case, the negative electrode collector foil is made of aluminum) or the like may be used.

The separator 1c may be formed of any member such as porous membrane, nonwoven fabric, or net, as long as the separator 1c has an electronic insulating property and a sufficient strength of adhesion to the positive electrode 1a and the negative electrode 1b. Although not limited to a particular material, a single layer porous membrane made of polyethylene, polypropylene, or the like, or a multilayered porous membrane of them is preferable from view point of adhesiveness and safety.

In addition, as solvent and electrolyte salt used for the electrolyte DL as ionic conductor, nonaqueous solvent and electrolyte salt containing lithium, which are used in conventional batteries, may be used. Specific examples of the solvent include: single liquids including ester-type solvents such as ethylene carbonate, propylene carbonate, dimethyl carbonate, diethyl carbonate, and methyl ethyl carbonate and ether-type solvents such as dimethoxyethane, diethoxyethane, diethyl ether, and dimethyl ether; and mixed liquids each formed of two kinds of solvents belonging to the same type of solvent described above or mixed liquids each formed of two kinds of solvents belonging to the different types of solvent described above. As the electrolyte salt, $LiPF_6$, $LiAsF_6$, $LiClO_4$, $LiBF_4$, $LiCF_3SO_3$, $LiN(CF_3SO_2)_2$, $LiC(CF_3SO_2)_3$, or $LiN(C_2F_5SO_2)_2$ may be used.

Further, in this embodiment, the positive electrode terminal 3a is made of aluminum similarly to the positive electrode collector 11, and the negative electrode terminal 3b is made of copper similarly to the negative electrode collector 13, or nickel. However, the material is not limited in particular, and it is desirable to use a metal material that is stable in an electrochemical manner. Each of the electrode terminals 3a and 3b is formed as a plate-like terminal. The sheet-type electrodes 1a and 1b are connected to the corresponding electrode terminals 3a and 3b by ultrasonic welding from viewpoint of reducing connection resistance. In addition, as to dimensions of the electrode terminals 3a and 3b, considering processability in soldering with a protection circuit board or considering larger capacity, the thickness is preferable to be 0.2 to 5.0 mm. Further, considering resistance to large current (rush current) and mechanical strength, the thickness is more preferable to be 1.0 to 5.0 mm. In addition, each width of the electrode terminals 3a and 3b (length along the heat seal portion 20) is preferable to be approximately 16 to 100 mm considering the processability and the larger capacity (for example, 1.5 Ah or larger is preferred for an HV, and 15 Ah or larger is preferred for an EV).

In the present invention, the flexible laminated sheath 2, which houses the internal electrode pair 1 and the electrolyte DL inside in a sealed state, is not limited in particular, as long as the laminated sheath 2 has sufficient strength for use as a battery case of the sheet-type secondary battery 10 and has superior resistance to the electrolyte DL to be housed. Specifically, a laminated film having a three-layered structure may be used for constituting the laminated sheath 2. The three-layered structure includes: on an inner side, an inner layer made of a thermoplastic resin such as polyethylene, polypropylene, polyamide, or ionomer resin, for example, which is superior in resistance to the electrolyte and heat sealing performance; in the middle thereof, an intermediate layer made of metal foil such as aluminum foil or stainless steel foil, for example, which is superior in flexibility and strength; and on an outer side, an outer layer is made of an insulating resin such as a polyamide resin or a polyester resin, for example, which is superior in electric insulating performance.

The laminated sheath 2 according to this embodiment is formed of a laminated film having a three-layered structure including: on an inner side, an inner layer 2a made of polypropylene (having a thickness of 15 to 100 μm); in the middle thereof, an intermediate layer 2b made of aluminum foil (having a thickness of 30 to 80 μmm); and on an outer side, an outer layer 2c made of nylon (having a thickness of 12 to 60 μm). Then, in a part of the laminated sheath 2 corresponding to a part housing the internal electrode pair 1 as a laminated body, there is formed a laminated body housing portion 2s having a substantially rectangular shape in plan view (a cross section parallel to the sheet-type electrodes 1a and 1b has a substantially rectangular shape) so as to swell in the thickness direction. In the periphery of the laminated sheath 2, there is formed the heat seal portion 20.

In addition, as illustrated best in FIG. 3, a bonding resin 5 is applied to a part around the electrode terminal 3a opposed to the heat seal portion 20 of the inner layer 2a of the laminated sheath 2. Note that, a surface of the electrode terminal 3 to which the bonding resin 5 is applied is roughened in advance (for example, a center line average roughness Ra is 0.1 to 1.0 μm). In this manner, good adhesiveness between the electrode terminal 3 and the bonding resin 5 can be secured.

On the other hand, a plurality of dents 20a as recesses toward the outer layer 2c are formed at least on the inner layer 2a (heat seal portion 20) of the laminated sheath 2 opposed to the bonding resin 5. Further, the dents 20a correspond to an excess resin receiving portion according to this embodiment, for receiving (absorbing) the excess bonding resin 5 in the heat sealing process.

In the sheet-type secondary battery 10 according to this embodiment, the inner layer 2a of the laminated sheath 2 is bonded to the electrode terminal 3 with the bonding resin 5 adhered to the periphery of the electrode terminal 3 as described above. Thus, in particular, the electrode terminal 3 having a large cross-sectional area (large thickness and width) for larger capacity can be bonded to the thin laminated sheath 2. In addition, the periphery of the electrode terminal 3 is covered with the bonding resin 5, and hence direct contact (mechanical contact) between corner edges of the electrode terminal 3 and the laminated sheath 2 is avoided so that damage to the inner layer 2a due to the contact is prevented.

Note that, the material of the bonding resin 5 may be selected appropriately and arbitrarily as long as the bonding resin 5 is disposed between the electrode terminal 3 and the inner layer 2a of the laminated sheath 2 so as to bond them in an adhesive manner by a hot pressing process. However, from viewpoint of securing good adhesiveness between the inner layer 2a of the laminated sheath 2 and the electrode terminal 3, the bonding resin 5 is preferred to be a thermoplastic resin (in this example, polypropylene) similarly to at least the inner layer 2a of the laminated sheath 2. It is more preferred to perform a crosslinking process on the bonding portion of the electrode terminal 3 and the bonding resin 5. Specifically, the bonding resin 5 may be a thermoplastic resin (for example, cross-linked polypropylene) which is subjected to an electron beam crosslinking process (process for forming a crosslinked structure at an arbitrary part between high polymers) on a portion (surface) of the bonding resin 5 opposed to the electrode terminal 3, to thereby enhance a degree of crosslinking of the portion so that the degree of crosslinking has gradient. Thus, good sealing performance and weathering performance can be secured.

By the way, when such an electrode terminal 3 having a large cross-sectional area for larger capacity (for example, 1.5 Ah or larger) and the flexible laminated sheath 2 are heat sealed with the bonding resin 5, if the thickness of the interposed bonding resin 5 is small, insulating performance between the metal layer 2b of the laminated sheath 2 and the electrode terminal 3 may be deteriorated. On the other hand, it is found by studies of the inventors of the present invention that if the thickness of the interposed bonding resin 5 is large, a possibility that moisture or the like that may cause deterioration of battery performance enters inside of the laminated sheath 2 is increased, and the resin layer thickness becomes uneven around the electrode terminal 3 because of the excess bonding resin 5 in the heat sealing process.

Specifically, the following fact is found by studies of the inventors of the present invention. In the heat sealing process, the excess bonding resin 5 is pushed out by the hot pressure welding and moves along the surface of the electrode terminal 3 so that melt flow, melt lump (resin lump), or the like is generated. Consequently, a gap is generated between the laminated sheath 2 and the electrode terminal 3, or an isolation distance between the metal layer 2b of the laminated sheath 2 and the electrode terminal 3 becomes uneven (unstable) so as to cause a deterioration of the sealing performance or the insulating performance around the electrode terminal 3.

Therefore, the thickness of the bonding resin 5 is required to be set to an appropriate value capable of securing both the sealing performance and the insulating performance around the electrode terminal 3 (for example, such that the "total thickness of the resin layer after sealing (total thickness of the bonding resin 5 and the inner layer 2a made of a thermoplastic resin)" becomes 65 to 90% of the "total thickness before sealing"). However, in order to maintain such an appropriate value (range) so that an excess resin is not generated in the heat sealing process, it is necessary to perform troublesome and complicated adjustment control of pressure and the like by taking the thickness of the bonding resin 5 into account, which causes a problem that productivity (yield) is outstandingly lowered.

Therefore, in the sheet-type secondary battery 10 of this embodiment, the excess resin receiving portion 20a as pockets (dents) for receiving (absorbing) the excess bonding resin 5 in the heat sealing process is formed in the predetermined inner layer 2a of the laminated sheath 2 as follows. Thus, even when the electrode terminal 3 having a large cross-sectional area is adopted, the bonding resin 5 can be filled between the electrode terminal 3 and the laminated sheath 2 uniformly and gaplessly without troublesome adjustment control of the thickness of the bonding resin 5, the pressure, or the like.

Next, a method of manufacturing the sheet-type secondary battery having the above-mentioned structure is further described with reference to the attached drawings.

First, the sheet-type positive electrodes 1a each formed by applying the positive active material 12 to both sides of the positive electrode collector 11 made of aluminum and the sheet-type negative electrodes 1b each formed by applying the negative active material 14 to both sides of the negative electrode collector 13 made of copper are alternately laminated via the separators 1c so as to form the internal electrode pair 1 as the electrode laminated body, and end portions of the sheet-type electrodes 1a and 1b are collected and placed on the corresponding electrode terminals 3a and 3b so as to be welded and connected integrally by ultrasonic welding or the like.

In addition, the cup-like laminated body housing portion having a substantially rectangular shape in cross section, for housing the internal electrode pair 1 is formed on the inside of the laminated sheath 2 by press working. Note that, the laminated body housing portion 2s may be formed on one of the pair of opposed laminated sheaths 2. Alternatively, depending on the thickness or the shape of the internal electrode pair 1 to be housed, the laminated body housing portion 2s may be formed on both of the pair of opposed laminated sheaths 2.

Next, the bonding resin 5 (in this example, cross-linked polypropylene) having a predetermined thickness (for example, 0.05 to 0.15 mm) is laminated and formed on a part of the electrode terminal 3 corresponding to the heat seal portion 20 of the laminated sheath 2. Specifically, the surface of the electrode terminal 3 is roughened, and the heated bonding resin 5 is applied onto the surface and cooled so that the thermoplastic bonding resin 5 is adhered to the periphery of the electrode terminal 3.

Then, in the state where both the electrode terminals 3a and 3b are led out to the outside from the two opposed sides of the pair of opposed laminated sheaths 2, the internal electrode pair 1 is housed in the laminated body housing portion 2s of the laminated sheath 2, and the electrode terminals 3a and 3b are sandwiched by the heat seal portions 20 on the periphery of the upper and lower laminated sheaths 2.

Figure 5:
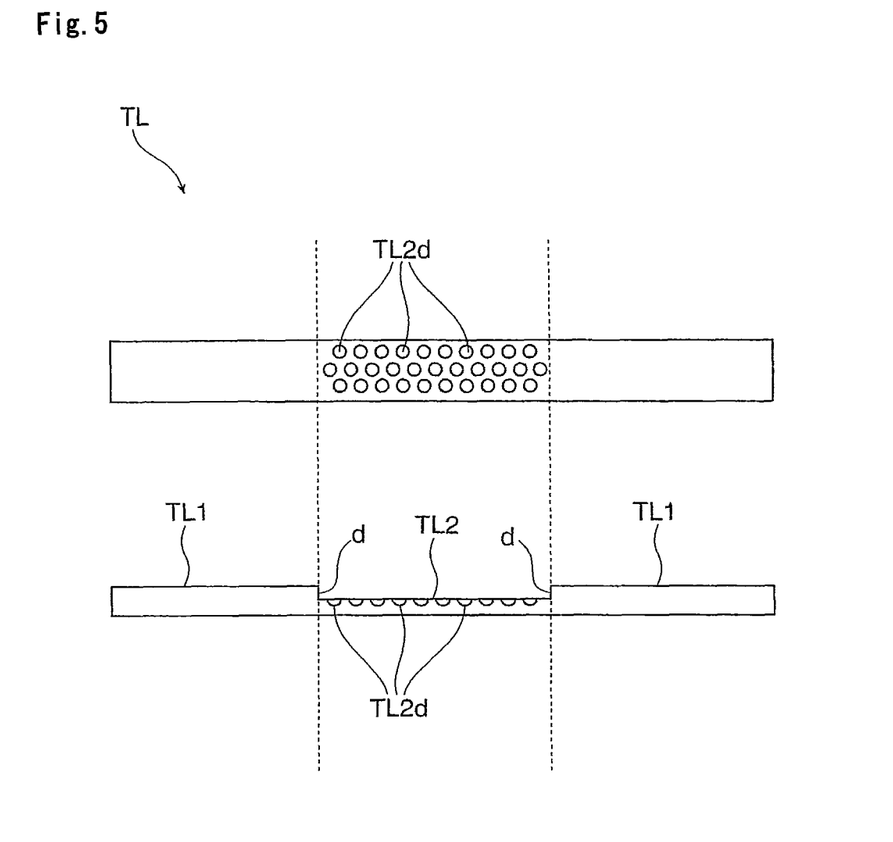
FIG. 5 is a schematic diagram illustrating a structure of a sealing jig used for a method of manufacturing the sheet-type secondary battery according to the present invention.

Next, using a pair of sealing jigs TL, TL having a recess shape as schematically illustrated in FIG. 5 (only one of the pair of sealing jigs is illustrated in the diagram for simple illustration), the heat seal portions 20 on the sides of the laminated sheaths 2 from which the electrode terminal 3 protrudes are sandwiched and are hot pressed at a predetermined temperature (for example, 220 to 230° C.) and pressing force (for example, 0.4 MPa). Here, the pair of sealing jigs TL, TL according to this embodiment have the same structure, and each of them includes a flat reference seal surface TL1 for hot-pressing a normal heat seal portion (in which the inner layers 2a of the laminated sheaths 2 are bonded to each other, which is hereinafter referred to as a normal seal portion 20P) disposed on both end portions in the longitudinal direction, and a receiving portion forming surface TL2 for hot-pressing, together with the bonding resin 5 and the electrode terminal 3, a heat seal portion formed between the reference seal surfaces TL1 and TL1 on both end portions, in which the laminated sheath 2 is opposed to the electrode terminal 3 (heat seal portion in which the electrode terminal 3 is interposed, which is hereinafter referred to as a terminal-interposed seal portion 20D), the receiving portion forming surface TL2 including irregularities for forming the excess resin receiving portion 20a on the inner layer 2a of the laminated sheath 2.

Specifically, there is a step difference d in the height direction between the reference seal surface TL1 and the receiving portion forming surface TL2 of each of the pair of sealing jigs TL, TL, and dents (recesses with respect to the outer layer 2c) TL2d for forming the excess resin receiving portion 20a are formed on the receiving portion forming surface TL2 so as to be opposed to the upper surface or the lower surface of the electrode terminal 3. When the pair of sealing jigs TL, TL is set to the heat seal portions 20 and 20 (outer layers 2c and 2c) of the pair of laminated sheaths 2 and 2 from which the electrode terminal 3 protrudes (the pair of opposed heat seal portions 20 and 20 are sandwiched between the pair of upper and lower sealing jigs TL, TL) so as to perform heat sealing (hot pressing at a predetermined temperature and pressing force), a predetermined isolation distance is secured between the electrode terminal 3 and each of the receiving portion forming surfaces TL2, TL2.

In other words, the above-mentioned step difference d is set so as to satisfy the following condition. When the normal seal portion 20P is heat sealed by the flat reference seal surfaces TL1, the isolation distance between the receiving portion forming surface TL2 and the electrode terminal 3 becomes a predetermined isolation distance that enables securing of both the sealing performance and the insulating performance around the electrode terminal 3. More specifically, in this embodiment, the above-mentioned step difference d is set so that, in the terminal-interposed seal portion 20D, the total thickness of the resin layer after sealing becomes 65 to 90% of the total thickness before sealing.

Here, an approximate setting range (permissible range) of the above-mentioned step difference d can be determined in advance by actual measurement or the like in accordance with predetermined heat seal conditions such as receiving capacity of the excess resin receiving portion 20a, and pressure and temperature in the heat sealing process when the laminated sheath 2 and the electrode terminal 3 are heat sealed with the bonding resin 5. In other words, in this embodiment, with use of the pair of sealing jigs TL, TL having the predetermined step difference d, the position at which the excess resin receiving portion 20a is formed in the terminal-interposed seal portion 20D can be stably set to such an appropriate position that both the sealing performance and the insulating performance around the electrode terminal 3 can be satisfied, based on the flat reference seal surface TL1 of the normal seal portion 20P.

Note that, FIG. 5 illustrates an example of the shape and arrangement of the dents TL2d of the sealing jig TL for forming the excess resin receiving portion 20a, in which the dents having a circular shape in plan view are arranged in a staggered manner. However, the shape and arrangement can be selected appropriately and arbitrarily as long as the dents can receive the excess resin 5. For instance, the dent may have a polygonal shape in plan view, or the dents having an arbitrary shape may be arranged regularly in rows and columns like a grid. In addition, these shapes and arrangements may be combined appropriately. However, in order to receive the excess resin 5 moving along the surface of the electrode terminal 3, it is preferred to provide a plurality of dents TL2d along the longitudinal direction (direction along the heat seal portion 20) and in the width direction (direction in which the electrode terminal 3 protrudes) of the inner layer 2a corresponding to the electrode terminal 3.

Then, the laminated sheath 2, the bonding resin 5, and the electrode terminal 3 are sandwiched by the pair of sealing jigs TL, TL, and the heat sealing process is performed at a predetermined temperature and pressing force. Then, as illustrated schematically in FIG. 6(a), the layers 2a, 2b, and 2c of the laminated sheath 2 sandwiched between the sealing jig TL and the electrode terminal 3 via the bonding resin 5 are integrally deformed so as to fit the shape of the dents TL2d formed on the receiving portion forming surface TL2 of the sealing jig TL. Thus, in the terminal-interposed seal portion 20D, the excess resin receiving portion 20a which is capable of receiving the excess resin is formed at least on the inner layer 2a of the laminated sheath 2 based on the flat reference seal surface TL1. In other words, the excess resin receiving portion 20a is formed at a predetermined position (height) in the terminal-interposed seal portion 20D in which the electrode terminal 3 is interposed, while the excess resin receiving portion 20a is not formed in the normal seal portion 20P in which the electrode terminal 3 is not interposed (in the heat seal portion where the inner layers 2a of the laminated sheaths 2 are bonded).

After that, one side of two unsealed sides around the laminated sheath 2 (heat seal portion 20) is hot pressed so that the inner resin layer 2a of the laminated sheath 2 is heat sealed so as to form a three-side sealed body with one unsealed side as an opening part. After filling the electrolyte through the opening part, the remaining open side is heat sealed so that the sheet-type secondary battery is completed.

As described above, the laminated sheath 2 is sandwiched by using the pair of sealing jigs TL, TL having a predetermined shape in the heat sealing process, and thus the predetermined excess resin receiving portion 20a can be formed at the same time as the heat sealing as a part of the heat sealing process without adding another step for forming the predetermined excess resin receiving portion 20a. Therefore, it is possible to contribute to simplification of the steps.

In addition, with use of the pair of sealing jigs TL, TL, the outer surface of the laminated sheath 2 is pressed so that the layers 2a, 2b, and 2c of the laminated sheath 2 are integrally deformed so as to fit the shape of the dents TL2d of the receiving portion forming surface TL2. As a result, protrusions protruding from the outer surface of the laminated sheath 2 are formed, and hence it is possible to determine a state where the excess resin receiving portion 20a is formed from external appearance. Specifically, if the protrusions protruding from the surface are formed on the outer layer 2c of the laminated sheath 2 after the heat seal, it can be determined that the appropriate excess resin receiving portion 20a is formed on the inner layer 2a of the laminated sheath 2. Therefore, the state where the excess resin receiving portion 20a is formed (sealed state) can be easily confirmed by visual inspection.

Although illustration is omitted, in the case of a form in which both the electrode terminals 3a and 3b protrude from one side of the laminated sheath 2, the sealing jig TL having two receiving portion forming surfaces TL2, TL2 corresponding to portions from which the electrode terminals 3a and 3b protrude may be used so that the excess resin receiving portion 20a can be formed in the same procedure.

Figure 6:
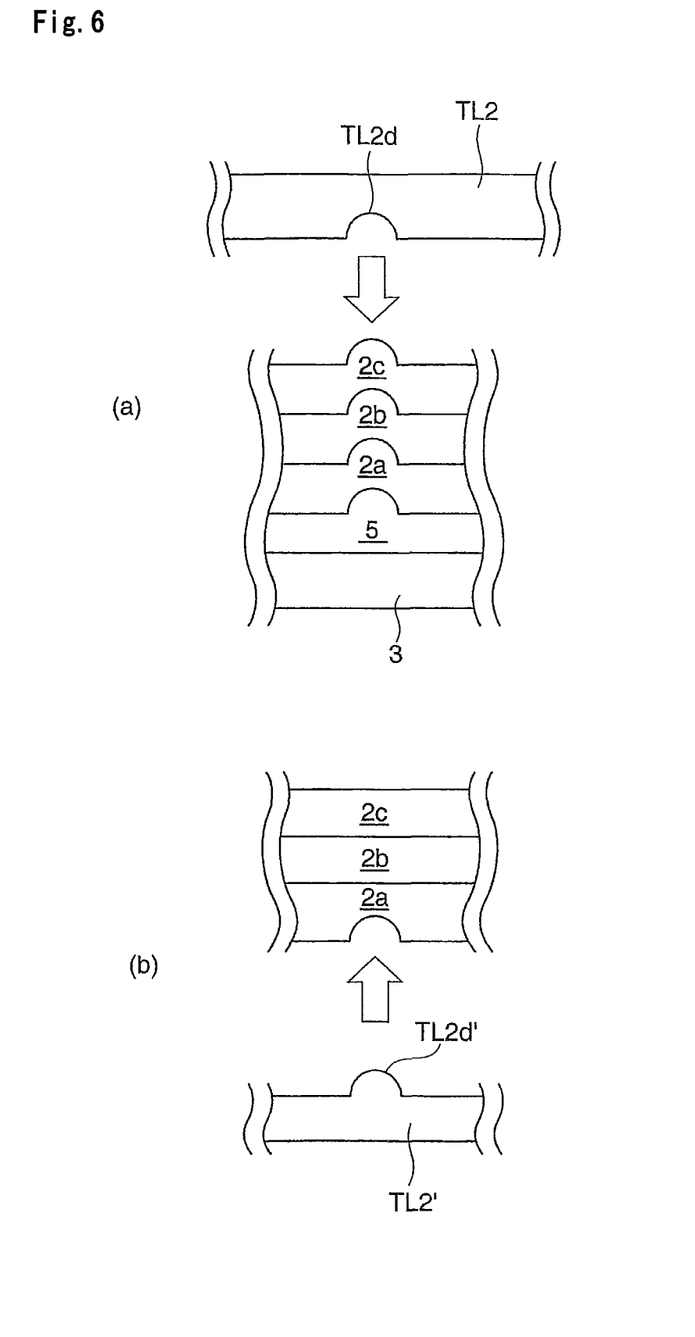

In addition, the pair of sealing jigs TL, TL are pressed to the outer surface 2c of the laminated sheath 2 so that the layers 2a, 2b, and 2c are integrally deformed (see FIG. 6(a)) in the embodiment described above. However, it is possible to deform only the inner layer 2a by directly pressing the inner layer 2a of the laminated sheath 2 using a sealing jig TL' on which a receiving portion forming surface TL2' having protrusions TL2d' is formed as schematically illustrated in FIG. 6(b). With this structure, the depth of the excess resin receiving portion 20a is restricted, and another step for forming the excess resin receiving portion 20a is necessary, but it is possible to obtain the sheet-type secondary battery 10 including the laminated sheath 2 with a smooth surface (the outer surface 2c of the laminated sheath 2 has no protrusion).

EXAMPLES

Next, a result of evaluation of performances of the sheet-type secondary battery 10 having the excess resin receiving portion 20a according to the present invention is described below as Examples.

Note that, for the evaluation, the sheet-type secondary battery having the excess resin receiving portion 20a according to the present invention and a sheet-type secondary battery without the excess resin receiving portion 20a were manufactured, and the insulating performance and the sealing performance of them were compared and evaluated.

Figure 7:
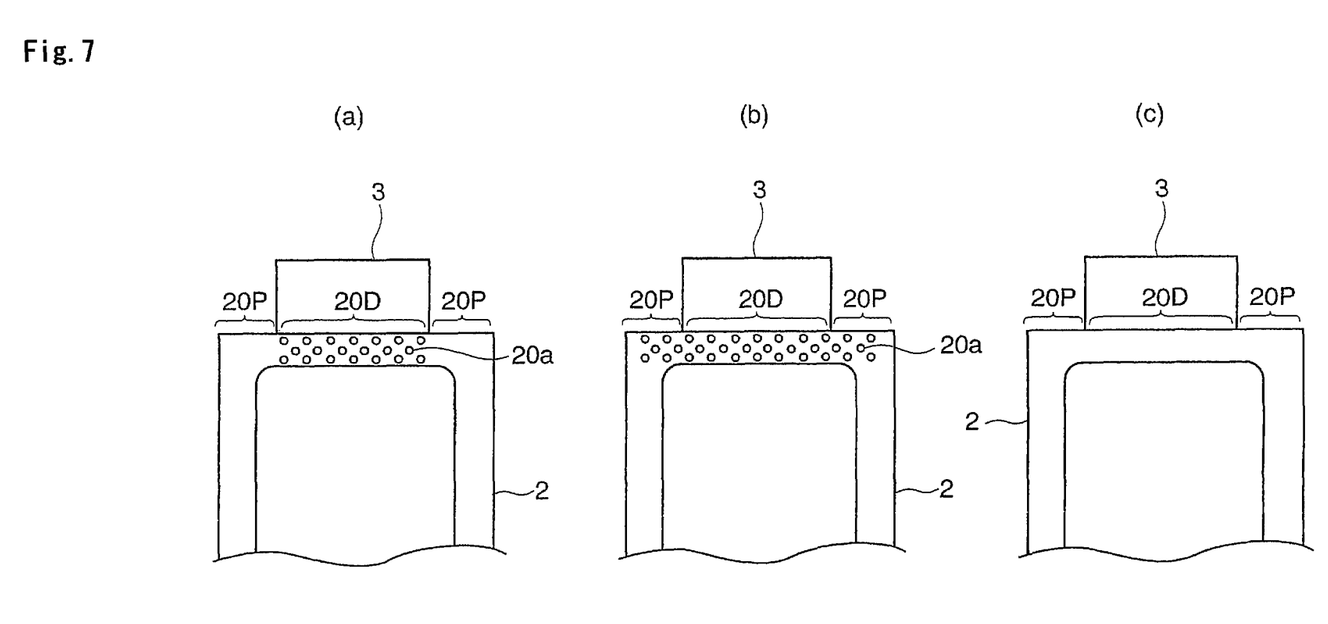
FIG. 7 are schematic diagrams illustrating a structure of the sheet-type secondary battery having the excess resin receiving portion according to an example and structures of sheet-type secondary batteries of comparative examples manufactured for comparative evaluation.

Specifically, as Example, a sheet-type secondary battery was manufactured, in which the excess resin receiving portion 20a was formed only in a predetermined region (terminal-interposed seal portion 20D) of the heat seal portion 20 using the pair of sealing jigs TL, TL illustrated in FIG. 5 (see FIG. 7(a)). In addition, as Comparative Example 1, a sheet-type secondary battery was manufactured, in which the excess resin receiving portion 20a was formed over the entire length of one side of the heat seal portion 20 from which the electrode terminal 3a or 3b protrudes (see FIG. 7(b)). Further, as Comparative Example 2, a sheet-type secondary battery having a conventional structure was manufactured, in which the inner layer 2a of the laminated sheath 2 is flat and the excess resin receiving portion 20a is absent (see FIG. 7(c)). Note that, each of the above-mentioned sheet-type secondary batteries had battery capacity of 4 Ah, and each of the electrode terminals 3a and 3b had a width of 30 mm and a thickness of 0.2 mm. In addition, the heat sealing process was performed under the condition of a temperature at 220 to 230° C. and a pressing force of 0.4 MPa.

<Comparative Evaluation 1>

Four sheet-type secondary batteries were manufactured for each of Example, Comparative Example 1, and Comparative Example 2. A predetermined voltage (0.1 kV) was applied between the metal layer 2b of the laminated sheath 2 and each of the electrode terminals 3a and 3b, and a holding voltage was measured after a predetermined time (5 msec) had elapsed. Here, as the applied voltage (0.1 kV) was maintained more (holding voltage was higher) after the predetermined time had elapsed, it was evaluated that the insulating performance was better.

Figure 8:
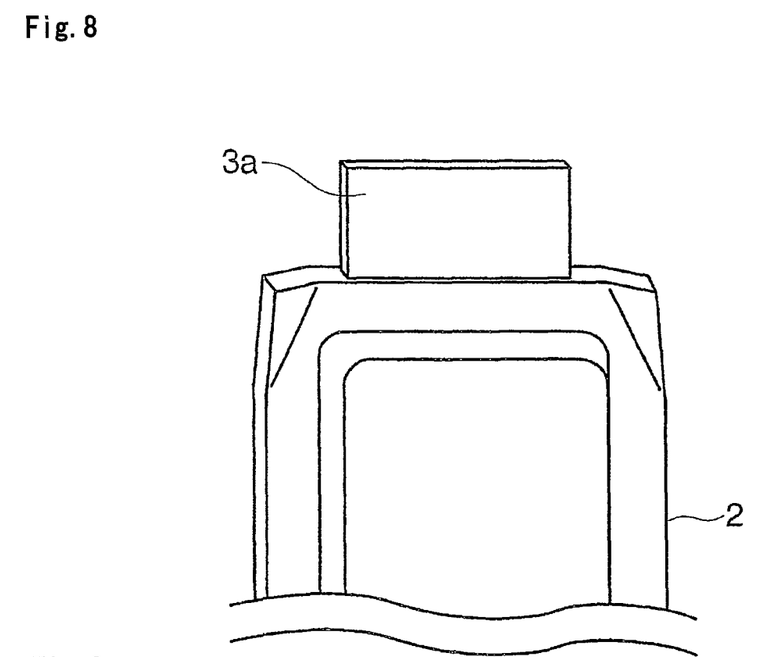
FIG. 8 is a schematic diagram illustrating a situation where a heat seal portion is bent for comparative evaluation.

In addition, in order to check an influence of an external stress such as bending load, after the measurement of the holding voltage was finished, both end portions of the heat seal portion 20 of the laminated sheath 2 (both end portions of the heat seal portion from which the electrode terminal 3a or 3b protrudes) were bent as schematically illustrated in FIG. 8. Then, a predetermined voltage was applied, and the holding voltage was measured after a predetermined time had elapsed. In other words, the holding voltage was measured before and after bending the laminated sheath 2.

A result of measurement of the holding voltage before bending is shown in Table 1, and a result of measurement of the holding voltage after bending is shown in Table 2.

TABLE 1

| | Holding voltage (corresponding number of cells) when a voltage of 0.1 kV is applied | | | |
|---|---|---|---|---|
| | 0.10 to 0.09 kV | 0.09 to 0.08 kV | 0.08 to 0.05 kV | 0.05 to 0.00 kV |
| Example | 4 | 0 | 0 | 0 |
| Comparative Example 1 | 4 | 0 | 0 | 0 |
| Comparative Example 2 | 1 | 1 | 2 | 0 |

TABLE 2

| | Holding voltage (corresponding number of cells) when a voltage of 0.1 kV is applied | | | |
|---|---|---|---|---|
| | 0.10 to 0.09 kV | 0.09 to 0.08 kV | 0.08 to 0.05 kV | 0.05 to 0.00 kV |
| Example | 4 | 0 | 0 | 0 |
| Comparative Example 1 | 0 | 0 | 1 | 3 |
| Comparative Example 2 | 1 | 1 | 2 | 0 |

From Table 1, it was confirmed that Example in which the excess resin receiving portion 20a is provided only to the terminal-interposed seal portion 20D, and Comparative Example 1 in which the excess resin receiving portion 20a is provided over the entire length of the sealing side from which the electrode terminal 3 protrudes had improved insulating performance compared with Comparative Example 2 without the excess resin receiving portion 20a.

On the other hand, from Table 2, it is understood that the insulating performance is lowered after the bending of the laminated sheath 2 in Comparative Example 1 while good insulating performance is maintained even after the bending in Example. In other words, it was understood that, through provision of the excess resin receiving portion 20a only in the heat seal portion 20D in which the electrode terminal 3a or 3b was interposed, good insulating performance could be maintained even if unexpected stress such as bending stress was applied to a periphery of the laminated sheath 2. In other words, it is understood that if the excess resin receiving portion 20a was provided also in the normal heat seal portion 20P where the electrode terminal 3a or 3b was not interposed (heat seal portion in which the inner layers 2a of the laminated sheaths 2 are bonded), it became difficult to maintain the insulating performance when external stress such as bending stress was applied.

The reason of this is considered as follows. In the form of Comparative Example 1 in which the excess resin receiving portion 20a is provided also in the normal seal portion 20P, there is a difference in thickness of the inner resin layer 2a in the normal seal portion 20P due to the irregularities formed over the normal seal portion 20P. Therefore, when an unexpected bending load or the like is applied to the flexible laminated sheath 2, a crack is apt to occur in the resin layer 2a so that the insulating performance is deteriorated. In addition, the occurrence of the crack may be a factor of deteriorating the sealing performance over time.

Note that, in the form using the flexible laminated sheath 2 as in the sheet-type secondary battery according to the present invention, there always exists the normal seal portion 20P in which the inner layers 2a of the laminated sheaths 2 are bonded. The normal seal portion 20P is easily deformable by external force, and it is certainly assumed that the heat seal portion is bent for reducing a volume of the battery. Concerning this situation, it was confirmed that according to the sheet-type secondary battery of the present invention in which the excess resin receiving portion 20a was provided only in the terminal-interposed seal portion 20D in which the electrode terminal 3a or 3b is interposed, the sealing performance and the insulating performance between the laminated sheath 2 and the electrode terminal 3a or 3b can be stably maintained even if the bending stress or the like was applied to the heat seal portion.

<Comparative Evaluation 2>

Figure 9:
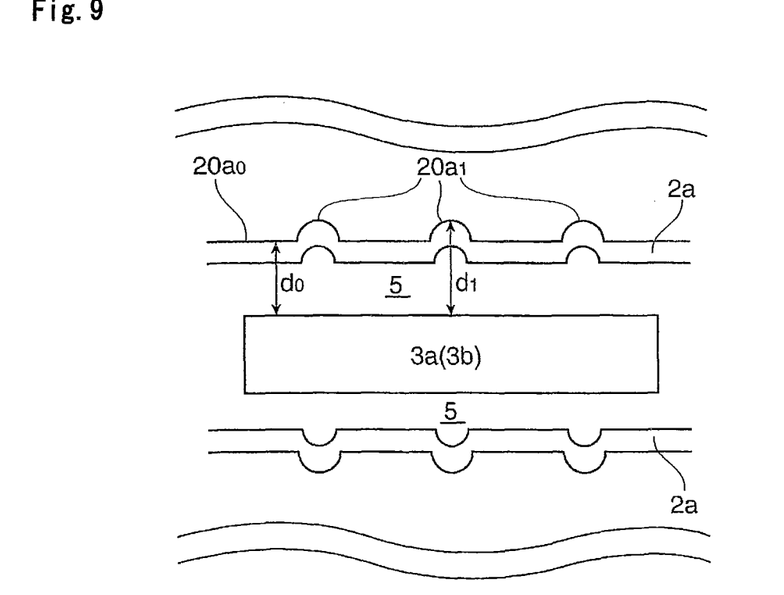
FIG. 9 is a schematic diagram illustrating a situation of a resin layer thickness for comparative evaluation.

Next, as to the sheet-type secondary batteries of Example and Comparative Examples 1 and 2, the total thickness of the resin before sealing and the total thickness of the resin after sealing were measured for comparative evaluation. Specifically, supposing that the total thickness before sealing (total thickness as the sum of the thickness of the bonding resin 5 and the thickness of the inner resin layer 2a) is 100%, as schematically illustrated in FIG. 9, ratios (%) of a thickness $d_0$ of a flat portion $20a_0$ and a thickness $d_1$ of a protrusion $20a_1$ of the excess resin receiving portion 20a after sealing to the total thickness before sealing were measured for comparative evaluation. A result of measurement is shown in Table 3.

TABLE 3

| | Terminal-interposed seal portion 20D | | Normal seal portion 20P | |
|---|---|---|---|---|
| | Flat portion thickness $d_0$ | Protrusion thickness $d_1$ | Flat portion thickness $d_0$ | Protrusion thickness $d_1$ |
| Example | 66.9 to 78.8% | 83.4 to 89.5% | 22.0 to 30.1% | — |
| Comparative Example 1 | 36.8 to 52.9% | 64.1 to 79.3% | to 5.0% | 68.5 to 77.8% |

TABLE 3-continued

| | Terminal-interposed seal portion 20D | | Normal seal portion 20P | |
|---|---|---|---|---|
| | Flat portion thickness $d_0$ | Protrusion thickness $d_1$ | Flat portion thickness $d_0$ | Protrusion thickness $d_1$ |
| Comparative Example 2 | 54.3 to 65.5% | — | 24.3 to 30.0% | — |

From Table 3, it was confirmed that in Example and Comparative Example 2, the resin layer thickness $d_0$ of the flat portion after sealing was maintained substantially the same in both the terminal-interposed seal portion 20D and the normal seal portion 20P.

Here, in view of the result of <Comparative Evaluation 1>, it is understood that an appropriate thickness of the resin layer in the terminal-interposed seal portion 20D that can secure the insulating performance and the sealing performance over time is 65 to 90% from Example shown in Table 3.

Note that, the resin layer thickness is maintained to a certain extent in Comparative Example 2 in which deterioration of the insulating performance is found in <Comparative Evaluation 1>. The reason for this is considered as follows. As described above as the problem, in Comparative Example 2 without the excess resin receiving portion 20a, the melt flow or the melt lump occurs often. The melt lump or the like is apt to occur in a boundary of the seal portion 20 (boundary between the seal portion 20 and a non-seal portion) and its vicinity when the excess resin moves on the electrode terminal 3. Further, because such a resin is basically melted without pressure and cured in a low density to form a resin layer, a crack is apt to occur even by a small external stress such as bending load. In other words, for convenience sake, Table 3 shows the thickness of the portion forming the excess resin receiving portion 20a on the electrode terminal 3 as illustrated in FIG. 9. Therefore, there is no obvious difference of the thickness of the portion between Example and Comparative Example 2. However, as described above, because Comparative Example 2 is in the state where a crack is apt to occur by a small external stress, it is considered that the insulating performance or the sealing performance is deteriorated.

On the other hand, in comparison between Example and Comparative Example 1, it was confirmed that the total thickness of the resin layer in the terminal-interposed seal portion 20D was reduced more in both the flat portion $20a_0$ and the protrusion $20a_1$ in Comparative Example 1 than in Example.

Further, as to the total thickness in the normal seal portion 20P in Comparative Example 1, it was confirmed that there was an extreme difference of the total thickness between the protrusion $20a_1$ and the flat portion $20a_0$, and in particular, there was a conspicuous decrease of the total thickness of the flat portion $20a_0$.

From this result, it is considered as follows. In the form in which the excess resin receiving portion 20a is provided also in the normal seal portion 20P in which the inner layers 2a of the laminated sheaths 2 are welded, the resin to remain in the flat portion $20a_0$ of the terminal-interposed seal portion 20D in which the electrode terminal 3 is interposed flows also into the normal seal portion 20P in a vicinity of the electrode terminal so that the total thickness of the resin layer in the terminal-interposed seal portion 20D is decreased. In addition, the resin flowing into the normal seal portion 20P extends off from the normal seal portion 20P, or extreme irregularities are formed on the normal seal portion 20P.

Note that, it was confirmed that this tendency was more conspicuous as the cross-sectional area of the electrode terminal 3a or 3b is larger for larger capacity.

<Comparative Evaluation 3>

Next, a seal defect rate and an insulation defect rate were compared and evaluated between the sheet-type secondary batteries of Example and Comparative Example 2 when total 1,100 batteries were manufactured. Note that, for the comparative evaluation, when liquid leak or the like occurred in the heat seal portion 20 after a predetermined time (for example, 24 H) had elapsed from the battery manufacture, the seal defect was determined. When an insulation resistance between the laminated sheath 2 and the electrode terminal 3a or 3b was 50 MΩ or lower, the insulation defect was determined. A result of the evaluation is shown in Table 4.

TABLE 4

| | Seal defect | Insulation defect |
|---|---|---|
| Example | 0.0% | 0.5% |
| Comparative Example 2 | 2.2% | 0.8% |

As apparent from Table 4, it was confirmed that in the form (Example) in which the excess resin receiving portion 20a was provided only in the terminal-interposed seal portion 20D, the insulating performance and the sealing performance could be stably secured over time.

As described above, according to the sheet-type secondary battery and the method of manufacturing the same according to this embodiment, the excess resin receiving portion 20a is formed with a simple structure on the predetermined inner layer 2a of the laminated sheath 2, so as to absorb and receive the excess bonding resin 5 in the heat sealing process. Thus, without troublesome and complicated adjustment control of the thickness of the bonding resin 5 and the pressing force, even when the electrode terminal 3 having a large cross-sectional area is adopted, the sealing performance and the insulating performance around the electrode terminal 3 can be stably secured. In particular, even if an unexpected external stress such as bending load is applied to a periphery of the laminated sheath 2 due to restriction of layout, the sealing performance and the insulating performance of the sheet-type secondary battery 10 can be stably secured.

In addition, through increase of a contact area (adhesion area) between the inner layer 2a of the laminated sheath 2 and the bonding resin 5, seal intensity around the electrode terminal 3 can be increased. In addition, through forming of the excess resin receiving portion 20a so as to deform the laminated sheath 2, stress around the electrode terminal 3 in the heat sealing process can be relaxed so that occurrence of wrinkles can be prevented.

In addition, the excess resin receiving portion 20a is formed with reference to the flat normal heat seal portion 20 (the heat seal portion in which the inner layers 2a of the laminated sheaths 2 are bonded without the electrode terminal 3). Therefore, the thickness of the bonding resin 5 can be easily controlled, and the thickness of the bonding resin 5 satisfying both the sealing performance and the insulating performance around the electrode terminal 3 can be stably and reliably secured. In addition, the formation position of the excess resin receiving portion 20a (position to start forming the excess resin receiving portion 20a viewed from the electrode terminal 3) and the depth thereof can be easily controlled. Thus, it is possible to contribute to promotion of mechanization and mass production.

Note that, the technical scope of the present invention is not limited to the embodiment described above, which can be modified or improved variously in the scope without deviating from the spirit of the present invention. For instance, the excess resin receiving portion 20a exemplified in the embodiment described above is provided on the inner layer 2a of the laminated sheath 2, but the excess resin receiving portion is only required to be formed between the laminated sheath 2 and the electrode terminal 3 so that the excess resin receiving portion can receive the excess bonding resin 5. For instance, it is possible that the electrode terminal 3 itself has irregularities, or a mesh-like net (net with irregularities) may be wound around the electrode terminal 3, so as to provide the excess resin receiving portion 20a on the electrode terminal 3 side.

REFERENCE SIGNS LIST

1: internal electrode pair, 1a: sheet-type positive electrode, 1b: sheet-type negative electrode, 1c: separator, 2: laminated sheath, 2a: inner layer, 2b: intermediate layer, 2c: outer layer, 2s: laminated body housing portion, 3a: positive electrode terminal, 3b: negative electrode terminal, 5: bonding resin, 10: sheet-type secondary battery, 11: positive electrode collector, 12: positive active material, 13: negative electrode collector, 14: negative active material, 20: heat seal portion, 20D: terminal-interposed seal portion, 20P: normal seal portion, 20a: excess resin receiving portion, d: step difference, DL: electrolyte, TL: sealing jig, TL1: reference seal surface, TL2: receiving portion forming surface, TL2d: dent

The invention claimed is:

1. A sheet-type secondary battery, comprising:
a pair of upper and lower flexible laminated sheaths, each of which includes an inner layer and a metal layer, the inner layer being made of a thermoplastic resin capable of heat sealing;
an internal electrode pair formed by alternately laminating a sheet-type positive electrode and a sheet-type negative electrode via a separator, the internal electrode pair being housed inside the pair of upper and lower flexible laminated sheaths in a sealed state by a heat seal portion formed on peripheries of the pair of upper and lower flexible laminated sheaths;
electrode terminals, each of which is connected electrically to the internal electrode pair and passes through the heat seal portion of the pair of upper and lower flexible laminated sheaths in a hermetic manner so as to be led out externally; and
a bonding resin member being applied to a part around the electrode terminal opposed to the heat seal portion of the inner layers of the pair of upper and lower flexible laminated sheaths,
wherein the pair of upper and lower flexible laminated sheaths and the electrode terminal are bonded with the bonding resin member at the heat seal portion in which the electrode teiininal is interposed between the pair of upper and lower flexible laminated sheaths,
wherein the inner layers of the pair of upper and lower flexible laminated sheaths opposed to the electrode terminal via the bonding resin member have excess resin receiving portions formed only thereon for receiving an excess of the bonding resin member in a heat sealing process, and the excess resin receiving portion is not formed in the heat seal portion at which the inner layers of the pair of upper and lower flexible laminated sheaths are mutually bonded to each other,
the bonding resin member comprises at least one resin selected from the group consisting of polypropylene and cross-linked polypropylene, and
the inner layer of each laminated sheath comprises at least one resin selected from the group consisting of polyethylene, polypropylene, polyamide, and ionomer resin, but when the bonding resin member comprises the polypropylene, the inner layer comprises at least one resin selected from the group consisting of polyethylene, polyamide, and ionomer resin.

2. A sheet-type secondary battery according to claim 1, wherein the excess resin receiving portion is formed by hot pressing so that, at the heat seal portion in which the electrode terminal is interposed, a total thickness as a sum of a thickness of the bonding resin member and a thickness of the inner layer of the flexible laminated sheath after sealing becomes 65 to 90% of the total thickness before sealing.

3. A sheet-type secondary battery according to claim 1, wherein the excess resin receiving portion is formed by hot pressing so as to have a predetermined step with respect to a normal heat seal portion at which the inner layers of the flexible laminated sheaths are bonded.

4. A sheet-type secondary battery according to claim 1, wherein the excess resin receiving portion is formed to protrude from an outer surface of the flexible laminated sheath.

5. A sheet-type secondary battery according to claim 1, wherein the bonding resin member is made of the same material as a material of the inner layer of the flexible laminated sheath, which is a thermoplastic resin having a crosslinked structure.

6. A sheet-type secondary battery according to claim 1, wherein the electrode terminals each comprise a plate-like terminal having a thickness of 0.2 to 5.0 mm and a length of 16 to 100 mm along the heat seal portion.

7. A sheet-type secondary battery according to claim 1, wherein the sheet-type secondary battery has a capacity of 1.5 Ah or larger.

8. A sheet-type secondary battery, comprising:
a pair of upper and lower flexible laminated sheaths, each of which includes an inner layer and a metal layer, the inner layer being made of a thermoplastic resin capable of heat sealing;
an internal electrode pair formed by alternately laminating a sheet-type positive electrode and a sheet-type negative electrode via a separator, the internal electrode pair being housed inside the pair of upper and lower flexible laminated sheaths in a sealed state by a heat seal portion formed on peripheries of the pair of upper and lower flexible laminated sheaths;
electrode terminals, each of which is connected electrically to the internal electrode pair and passes through the heat seal portion of the pair of upper and lower flexible laminated sheaths in a hermetic manner so as to be led out externally; and
a bonding resin member being applied to a part around the electrode terminal opposed to the heat seal portion of the inner layers of the laminated sheaths,
wherein the pair of upper and lower flexible laminated sheaths and the electrode terminal are bonded with the bonding resin member at the heat seal portion in which the electrode terminal is interposed between the pair of upper and lower flexible laminated sheaths, and
wherein the inner layers of the pair of upper and lower flexible laminated sheaths opposed to the bonding resin member have excess resin receiving portions formed thereon as recesses for receiving an excess of the bonding resin member in a heat sealing process, and the excess resin receiving portion is not formed in the heat seal portion at which the inner layers of the pair of upper and lower flexible laminated sheaths are mutually bonded to each other, the bonding resin member comprises at least one resin selected from the group consisting of polypropylene and cross-linked polypropylene, and the inner layer of each laminated sheath comprises at least one resin selected from the group consisting of polyethylene, polypropylene, polyamide, and ionomer resin, but when the bonding resin member comprises the polypropylene, the inner layer comprises at least one resin selected from the group consisting of polyethylene, polyamide, and ionomer resin.

9. A sheet-type secondary battery according to claim 1, wherein the bonding resin member comprises at least one resin selected from the group consisting of polypropylene and cross-linked polypropylene, and the inner layer of each laminated sheath comprises at least one resin selected from the group consisting of polyethylene, polyamide, and ionomer resin.

10. A sheet-type secondary battery according to claim 1, wherein the bonding resin member comprises cross-linked polypropylene, and the inner layer of each laminated sheath comprises at least one resin selected from the group consisting of polyethylene, polyamide, polypropylene and ionomer resin.

11. A sheet-type secondary battery according to claim 8, wherein the bonding resin member comprises at least one resin selected from the group consisting of polypropylene and cross-linked polypropylene, and the inner layer of each laminated sheath comprises at least one resin selected from the group consisting of polyethylene, polyamide, and ionomer resin.

12. A sheet-type secondary battery according to claim 8, wherein the bonding resin member comprises cross-linked polypropylene, and the inner layer of each laminated sheath comprises at least one resin selected from the group consisting of polyethylene, polyamide, polypropylene and ionomer resin.

* * * * *